United States Patent Office 3,755,369
Patented Aug. 28, 1973

3,755,369
CERTAIN PEROXY-CONTAINING 2-OXO-TETRAHYDROFURANS
Yun Ger Chang, Austin, Tex., assignor to Reichhold Chemicals, Inc., White Plains, N.Y.
No Drawing. Original application Sept. 5, 1968, Ser. No. 757,758, now Patent No. 3,647,822. Divided and this application May 25, 1971, Ser. No. 146,836
Int. Cl. C07d 5/34
U.S. Cl. 260—343.3        9 Claims

ABSTRACT OF THE DISCLOSURE

A difunctional hydroperoxide is reacted with either a γ-ketoacylhalide or a 2-aroylbenzoylhalide, in the presence of a basic reagent in an organic solvent like p-dioxane at a temperature ranging from about 10° C. to about 50° C. at a mole ratio from about 1:2 to about 1:10. The preferred temperature is between about 25° C. and 35° C. and the preferred mole ratio is from about 1:2 to about 1:2.5.

Novel organic peresters are produced which have been found to be excellent initiators in polymerization reactions, such as the polymerization of styrene, vinyl esters, alkyl methacrylates, and the like. These novel peresters have also been found to provide excellent cross-linking agents for polyethylene, polypropylene, and the like.

---

The present application is a division of application Ser. No. 757,758, filed Sept. 5, 1968 entitled "Certain Peroxy-Containing 2-Oxo-Tetrahydrofurans," now Pat. No. 3,647,822 dated Mar. 7, 1972.

The invention relates to a class of novel organic peroxides and methods of preparing them. More particularly, the present invention relates to difunctional pseudo peresters obtained by the reactions of difunctional hydroperoxides with γ-ketoacyl halides and with 2-aroylbenzoyl halides.

The difunctional pseudo peresters prepared in accordance with the process of the present invention may be represented by one of the following formulas (1) 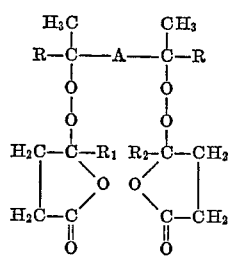

(2) 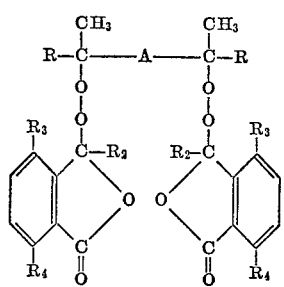

(3) 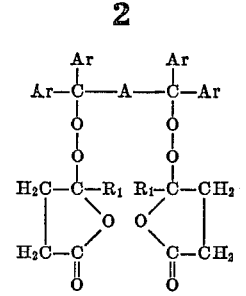

(4) 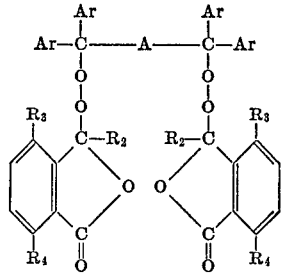

(5) 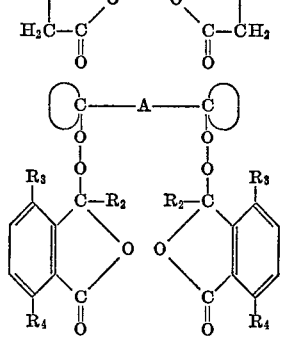

wherein R is either alkyl, cycloalkyl, alkcycloalkyl, aralkyl, aryl, alkaryl, or the corresponding halo substituted group; $R_1$ is an alkyl group; $R_2$ and Ar are either aryl or substituted aryl groups; $R_3$ and $R_4$ are either the same or different radicals selected from the family consisting of hydrogen and alkyl groups; A is a member of the group consisting of —$(CH_2)_n$—, —CH=CH—,

—$CH_2$—CH=CH—, and —C≡C—, n being an integer from 1 through 4; and

is a cycloaliphatic group.

It has been found that pseudo peresters possess relatively high thermal stability; for example, in dilute benzene solution, at 115° C., the half-life times of pseudo t-butylperoxy esters of 2-benzoylbenzoic acid and of levulinic acid are 14.5 and 17.6 hours, respectively. It has also been found that pseudo peresters have excellent catalytic behavior in cross-linking as well as polymerization reactions.

It is an object of this invention to provide a class of novel peroxides which are highly efficient polymerization initiators and cross-linking agents.

It is another object of the present invention to provide highly efficient methods for the preparation of such polymerization initiators and cross-linking agents.

It is a further object of this invention to produce these peroxides from difunctional hydroperoxides.

It is still another object of the present invention to make difunctional pseudo peresters.

These and other objects and advantages of the present invention will be more apparent from the following detailed description.

It has been found that these objects can be attained by reacting organic difunctional hydroperoxides with γ-ketoacyl halides or with 2-aroyl-benzoyl halides, in an organic solvent, in the presence of a base.

This reaction takes place at a temperature ranging from about 10° C. to about 50° C. However, the preferred reaction temperature is betwen about 25° C. and about 35° C., on account of the outstanding results obtained therefrom. At temperatures below this range, the reaction between acid halides and difunctional hydroperoxides appeared to be slow, evidenced by the relatively low yields of pseudo perester and by the recovery of large amounts of the corresponding organic acid and the unreacted difunctional hydroperoxide. At temperatures above this range, hydrolysis of the acid halide occurred before the pseudo perester was formed as shown by the high recoveries of hydroperoxide and organic acid.

In the reaction of this invention, in order to convert the difunctional hydroperoxide completely into difunctional pseudo perester without the presence of a hydroperoxide group in the final product, the mole ratio of difunctional hydroperoxide to γ-ketoacyl halide or to 2-aroylbenzoyl halide has to be 1:2 or lower. The mole ratio may vary widely, for example, from about 1:2 to about 1:10. However, the preferred mole ratio ranges from about 1:2 to about 1:2.5.

It has been found that p-dioxane is a suitable solvent for dissolving the solid reactants, difunctional hydroperoxides and 2-aroylbenzoyl halides, and for the reaction. Other ethers, such as tetrahydrofuran and diethyl ether can also be used as solvents.

In accordance with the present invention, a base is used as a reactant rather than a catalyst to remove the hydrogen halide formed during the reaction between the hydroperoxide and the acid halide. An organic base such as pyridine has been found to be a very suitable base, although inorganic bases such as sodium hydroxide, potassium hydroxide may be used for the same purpose. The amount of the base used should be enough to combine with the hydrogen halide produced or in a slight excess.

The difunctional hydroperoxides used in this invention for making pseudo peresters may be represented by at least one of the following formulas:

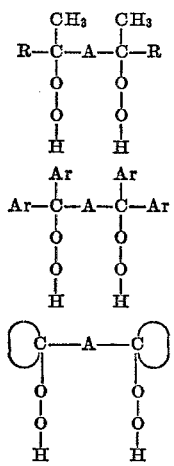

wherein R, A, Ar, and C are the same as previously indicated in formulas of the corresponding peroxides. The group of difunctional hydroperoxide consists of 2,5-dihydroperoxy - 2,5 - dimethylhexane, 3,6 - dihydroperoxy-3,6-dimethyloctane, 2,5-dihydroperoxy-2,5-dimethylhexyne-3, 3,6 - dihydroperoxy-3,6-dimethyloctyne-4, 1,4-dihydroperoxy-1,1,4,4-tetraphenylbutyne-2, bis (1-hydroperoxycyclohexyl) acetylene, 2,4-dihydroperoxy-2,4-dimethylpentane, and the like.

The halides of γ-ketoacids and 2-aroylbenzoic acids used as reactants in this invention are presumably the cyclic halides or pseudo halides, represented by the formulas:

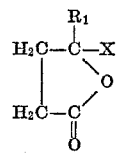

and

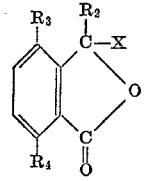

wherein $R_1$, $R_2$, $R_3$ and $R_4$ are as previously indicated in the formulas of the corresponding peroxides; and X is a halogen atom. Chlorides of these acids are preferred as reactants in the preparation of pseudo peresters. These chlorides can be prepared easily by reacting the corresponding acids with thionyl chloride, or phosphorus trichloride in benzene solution, according to the method described by Newman and McCleary, J. Am. Chem. Soc., 63, 1541 (1941). The group of these halides consists of the pseudo chlorides of levulinic acid, 2-benzoyl-benzoic acid, 2-(2-methylbenzoyl)benzoic acid, 2-(2,4-dimethylbenzoyl)benzoic acid, 2-(2,4,6-trimethylbenzoyl)benzoic acid, 2-benzoyl-3-methylbenzoic acid, 2-benzoyl-6-methylbenzoic acid, 2-(2-methylbenzoyl)-6-methylbenzoic acid, 2-benzoyl-3,6-dimethylbenzoic acid, 2-(2,4-dimethylbenzoyl) - 3,6 - dimethylbenzoic acid, 2 - (2,4,6-trimethylbenzoyl)-3,6-dimethylbenzoic acid, and the like.

In most cases, organic pseudo peresters appear to be heavy, viscous, syrup-like materials. It has been known that in the case of mono pseudo peresters, treatment with ethanol or methanol can rapidly convert the viscous materials into colorless crystalline solids. However, viscous difunctional pseudo peresters prepared according to the process of this invention have never been converted into crystalline solids by the treatment with organic solvents. Some products of this invention, for example, pseudo perester from 2,5-dihydroperoxy-2,5-dimethylhexane reacted with pseudo 2-benzoylbenzoyl chloride, look like crystalline material, but have never been separated as a solid. Although, usually, mixtures of potassium iodide or sodium iodide in acetic acid can completely reduce normal peresters as hydriodic acid does, pseudo peresters react only slightly with iodide-acetic acid mixture.

The members of this novel class of organic peroxides have been found to be excellent initiators in polymerization reactions, such as the polymerization of styrene, vinyl esters, alkyl methacrylates, and the like. These difunctional pseudo peresters have also been found to provide excellent crosslinking agents for polyethylene, polypropylene, and the like.

Some of the representative preparatory reactions are illustrated by the following equations.

3,755,369

EQUATION 1

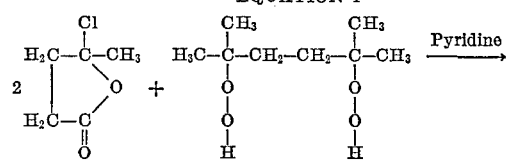

Pseudo chloride of levulinic acid     2,5-dihydroperoxy-2,5-dimethylhexane

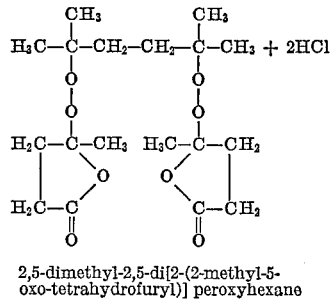

2,5-dimethyl-2,5-di[2-(2-methyl-5-oxo-tetrahydrofuryl)] peroxyhexane

EQUATION 2

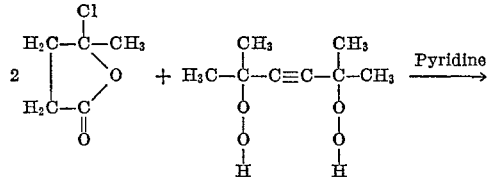

2,5-dihydroperoxy-2,5-dimethylhexyne-3

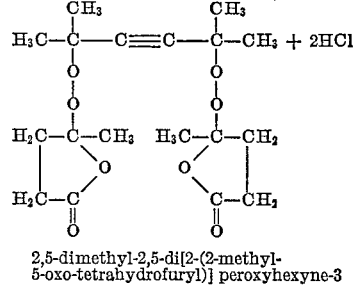

2,5-dimethyl-2,5-di[2-(2-methyl-5-oxo-tetrahydrofuryl)] peroxyhexyne-3

EQUATION 3

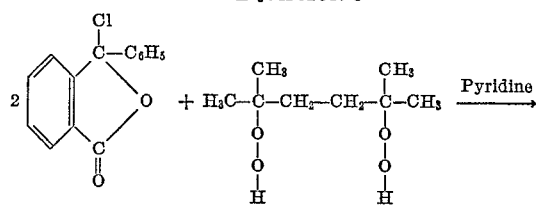

Pseudo chloride of 2-benzoylbenzoic acid

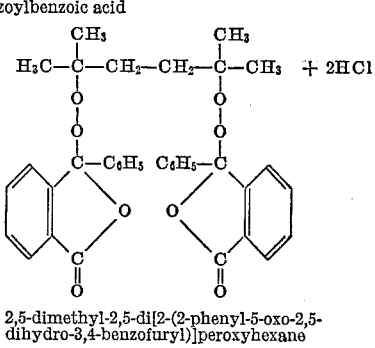

2,5-dimethyl-2,5-di[2-(2-phenyl-5-oxo-2,5-dihydro-3,4-benzofuryl)]peroxyhexane

EQUATION 4

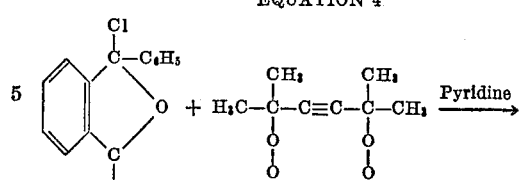

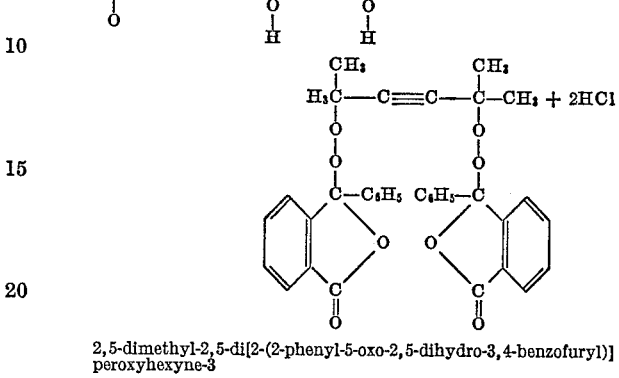

2,5-dimethyl-2,5-di[2-(2-phenyl-5-oxo-2,5-dihydro-3,4-benzofuryl)] peroxyhexyne-3

EQUATION 5

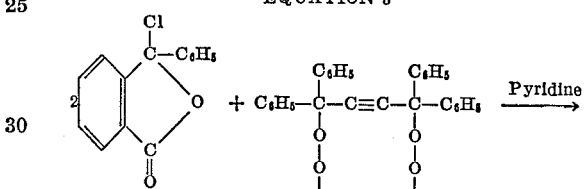

1,4-dihydroperoxy-1,1,4,4-tetraphenylbutyne-2

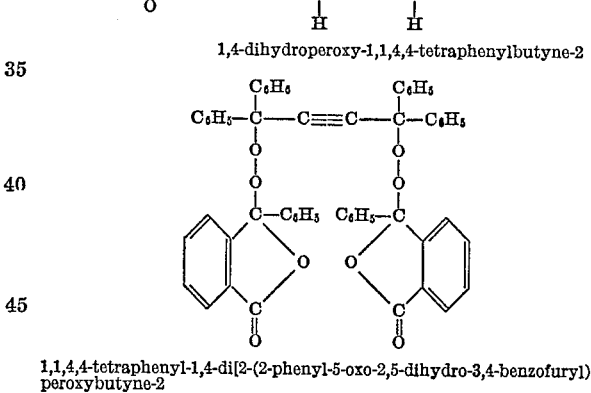

1,1,4,4-tetraphenyl-1,4-di[2-(2-phenyl-5-oxo-2,5-dihydro-3,4-benzofuryl)] peroxybutyne-2

EQUATION 6

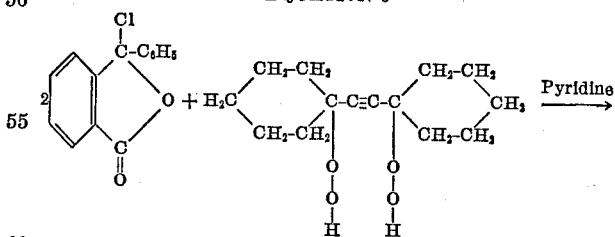

Bis(cyclohexyl-1-hydroperoxy) acetylene

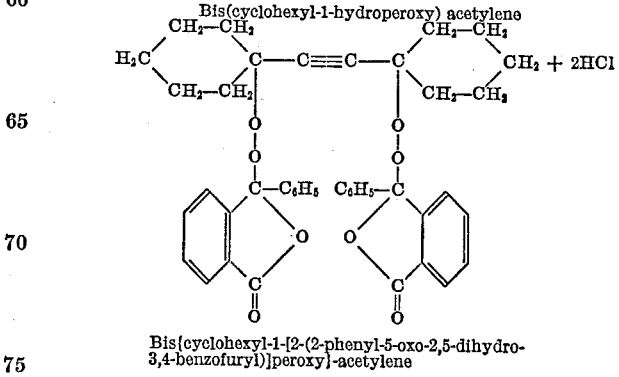

Bis{cyclohexyl-1-[2-(2-phenyl-5-oxo-2,5-dihydro-3,4-benzofuryl)]peroxy}-acetylene

EQUATION 7

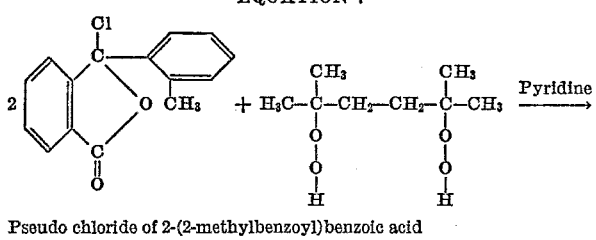

Pseudo chloride of 2-(2-methylbenzoyl)benzoic acid

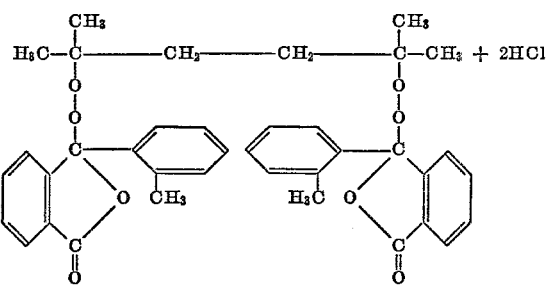

2,5-dimethyl-2,5-di{2-[2-(2-methylphenyl)-5-oxo-2,5-dihydro-3,4-benzo furyl]}peroxyhexane

EQUATION 8

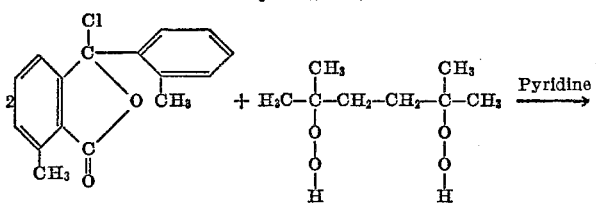

Pseudo chloride of 2-(2-methylbenzoyl)-6-methylbenzoic acid

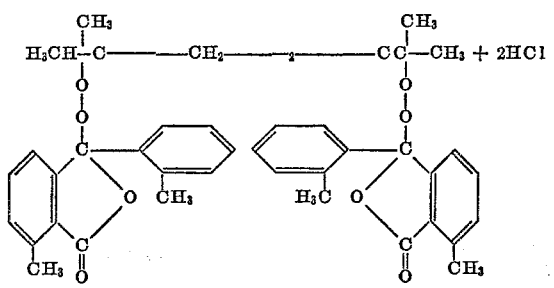

2,5-dimethyl-2,5-di-{2-[2-(2-methylphenyl)-5-oxo-2,5-dihydro-3,4-(6-methylbenzofuryl)}peroxyhexane The following examples are given for the purposes of illustrations of representative compounds prepared within the scope of this invention and are not to be deemed as limitative of this invention.

EXAMPLE 1

Preparation of 2,5-dimethyl-2,5-di[2-(2-methyl-5-oxo-tetrahydrofuryl)]peroxyhexane The pseudo chloride of levulinic acid was prepared by refluxing a mixture of 1.0 mole levulinic acid, 1.5 moles of thionyl chloride and 500 ml. of benzene, for about twenty hours. Thorough removal of low-boiling materials present in the reaction mixture under reduced pressure gave the reddish-brown liquid pseudo chloride in quantitative yield, based on the amount of levulinic acid used for the reaction. The pseudo chloride was employed for the preparation of pseudo peresters as described below.

A solution of 11.13 g. (0.05 mole) of 2,5-dihydroperoxy-2,5-dimethylhexane having an 80% purity, 7.90 g. (0.10 mole) of pyridine in 25 ml. of p-dioxane, was added to 16.14 g. (0.12 mole) of pseudo chloride of levulinic acid at 15–20° C. with agitation. The reaction mixture was stirred at 25–35° C. for four hours, and then allowed to stand at room temperature for about twelve hours. The mixture was diluted with 30 ml. of water, and extracted four times with 30-ml. portions of ether. The ether extract was washed five times with 20-ml. portions of a basic aqueous solution containing 1% of sodium hydroxide and 5% sodium bicarbonate, and twice with water. Finally, it was dried over anhydrous magnesium sulfate. Filtration and removal of low-boiling materials under reduced pressure using a water aspirator and a rotating evaporator left a reddish-brown liquid product, weighing 16.00 g., indicating an 85.6% yield, based on the amount of dihydroperoxide used for the reaction. The crude product contained a small amount of hydroperoxide shown by lead tetraacetate test. After being purified by distillation at 65–68° C. and 1.0 mm. the colorless heavy liquid contained 3.58% and 5.77% active oxygen determined by potassium iodide-sodium thiosulfate titration and by hydriodic acid-sodium thiosulfate titration, respectively.

The analytical result of this product did not fully agree with the theoretical values presumably due to a trace of impurity present.

A thin-layer chromatogram of this product on silica gel film, using a mixture of two volumes of carbon tetrachloride and one volume of acetone as solvent and hydriodic acid solution as developer, showed one spot.

The infrared spectrum of this product showed a strong band at 1760–1705 cm.$^{-1}$ due to carbonyl groups, a medium band at 1440 cm.$^{-1}$ and a strong band at 1350 cm.$^{-1}$ due to C—CH$_3$ groups, a medium band at 862 cm.$^{-1}$ representing peroxide groups.

EXAMPLE 2

Preparation of 3,6-dimethyl-3,6-di[2-(2-methyl-5-oxo-tetrafuryl)]peroxyoctane

The preparation described in Example 1 was repeated except that 10.30 g. (0.05 mole) of 3,6-dihydroperoxy-3,6-dimethyloctane was used, instead of 2,5-dihydroperoxy-2,5-dimethylhexane, as the peroxy reactant. A colorless heavy liquid product was obtained, and identified as the difunctional pseudo perester, 3,6-dimethyl-3,6-di[2-(2-methyl-5-oxo-tetrahydrofuryl)]peroxyoctane.

EXAMPLE 3

Preparation of 2,5-dimethyl-2,5-di[2-(2-methyl-5-oxotetrahydrofuryl)]peroxyhexyne-3

The preparation described in Example 1 was repeated except that 8.70 g. (0.05 mole) of 2,5-dihydroperoxy-2,5-dimethylhexyne-3, instead of 2,5-dihydroperoxy-2,5-dimethylhexane, was the hydroperoxide reactant. A colorless, heavy liquid product was obtained, and identified as the difunctional pesudo perester, 2,5-dimethyl-2,5-di[2-methyl-5-oxo-tetrahydrofuryl)]peroxyhexyne-3.

EXAMPLE 4

Preparation of 1,1,4,4-tetraphenyl-1,4-di[2-(2-methyl-5-oxo-tetrahydrofuryl)]peroxybutyne-2

The preparation described in Example 1 was repeated except that the peroxy reactant was 1,4-dihydroperoxy-1,1,4,4-tetraphenylbutyne-2, instead of 2,5-dihydroperoxy-2,5-dimethylhexane. A heavy, colorless liquid peroxide product was obtained and identified as the difunctional pseudo perester, 1,1,4,4-tetraphenyl-1,4-di-[2-(2-methyl-5-oxo-tetrahydrofuryl)]-peroxybutyne-2.

EXAMPLE 5

Preparation of 2,5-dimethyl-,5-di[2-(2-phenyl-5-oxo-2,5-dihydro-3,4-benzofuryl)]peroxyhexane The pseudo chloride of 2-benzoylbenzoic acid was prepared by refluxing a mixture of 1.0 mole of 2-benzoylbenzoic acid, 1.5 moles of thionyl chloride and 500 ml. of benzene, for about twenty hours. The low-boiling naterials present in the reaction mixture were thoroughly removed under reduced pressure using a water aspirator and a rotating evaporator. A viscous heavy liquid was obtained in a quantitative yield, based on the amount of 2-benzoylbenzoic acid used for the reaction. After standing for a few hours, the viscous liquid became colorless, crystalline solid, completely. This solid pseudo chloride was used as reactant in the following preparation.

A solution of 22.25 g. (0.10 mole) of 2,5-dihydroperoxy-2,5-dimethylhexane having 80% purity and 15.80 g. (0.20 mole) of pyridine in 50 ml. of p-dioxane, was added to 48.90 g. (0.20 mole) of finely divided pseudo chloride of 2-benzoylbenzoic acid, in a beaker, at 15–20° C. with agitation. The reaction mixture was stirred at 25–35° C., for four hours and then allowed to stand at room temperature for about twelve hours. It was diluted with 100 ml. of water, and then extracted five times with 80-ml. portions of ether. The ether solution was washed three times with 100-ml. portions of saturated sodium bicarbonate solution and three times with 100-ml. portions of water, and finally dried over anhydrous magnesium sulfate. Filtration and removal of low-boiling materials under reduced pressure with a water aspirator and a rotating evaporator gave a light-brown, very viscous, syrup-like product, weighing 48.00 g., indicating an 80.8% yield, based on the amount of pseudo chloride of 2-benzoylbenzoic acid used. This crude product contained a trace of hydroperoxide as shown by the lead tetraacetate test, and 3.29% and 4.09 active oxygen determined by potassium iodide-sodium thiosulfate titration and by hydriodic acid-sodium thiosulfate titration, respectively, as compared with the theoretical active oxygen content 5.38%.

The product was purified by dissolving in ether and by washing the resulting ether solution ten times with a basic aqueous solution containing 1% of sodium hydroxide and 5% of sodium bicarbonate. After drying and removal of ether under reduced pressure, a light-brown, viscous material was recovered, containing no hydroperoxide as shown by the lead tetraacetate test, 1.78% active oxygen determined by potassium iodide-sodium thiosulfate titration and 3.74% active oxygen determined by hydriodic acid-sodium thiosulfate titration. The viscous product looked like a crystalline material, but has never been separated as a solid. The analytical results of this product did not agree fully with the theoretical values, presumably due to the contamination with some impurity.

*Analysis.*—Calcd. for $C_{36}H_{34}O_8$ (percent): C, 72.71; H, 5.76; O, 21.53 (molecular weight 594). Found (percent): C, 71.47; H, 6.52; O, 22.41 (molecular weight 508).

A thin-layer chromatogram of this product on silica gel film when a mixture of two volumes of carbon tetrachloride and one volume of acetone was used as solvent and a hydriodic acid solution was the developing agent, showed mainly one brown spot.

The infrared spectrum of this material is a 10% methylene chloride solution showed a very strong band at 1780–1740 cm.$^{-1}$ due to carbonyl groups, a medium band at 1594 cm.$^{-1}$ due to phenyl groups, a strong band at 1360 cm.$^{-1}$ indicating $C(CH_3)_2$ groups, and a medium band at 876–863 cm.$^{-1}$ representing peroxide groups.

On the basis of this data, the structure of this compound is assigned as shown on the right-hand side of Equation 3.

EXAMPLE 6

Preparation of 3,6-dimethyl-3,6-di[2-(2-phenyl-5-oxo-2,5-dihydro-3,4-benzofuryl)] peroxyoctane To 24.45 g. (0.10 mole) of finely divided pseudo chloride of 2-benzoylbenzoic acid was added a solution of 10.3 g. (0.05 mole) of 3,6-dihydroperoxy-3,6-dimethyloctane and 7.90 g. (0.10 mole) of pyridine in 25 ml. of p-dioxane, at 15–20° C., with agitation. The reaction mixtures was stirred at 25–35° C. for four hours and then allowed to stand at room temperature for about twelve hours. After being diluted with 50 ml. of water, the mixture was extracted five times with 40 ml. portions of ether. The ether solution was washed ten times with 20 ml. portions of a basic aqueous solution containing 1% of sodium hydroxide and 5% of sodium bicarbonate and three times with 20 ml. portions of water, and finally dried over anhydrous magnesium sulfate. Filtration and thorough removal of low-boiling materials under reduced pressure using a water aspirator and a rotating evaporator left a light-brown, viscous, syrup-like product, in a yield of 80%, based on the amount of pseudo chloride of 2-benzoylbenzoic acid used for the reaction. The product was identified as the difunctional pseudo perester 3,6-dimethyl-3,6-di-[2-(2 - phenyl-5-oxo-2,5-dihydro-3,4-benzofuryl)] peroxyoctane.

EXAMPLE 7

Preparation of 2,5-dimethyl-2,5-di[2-(2-phenyl-5-oxo-2,5-dihydro-3,4-benzofuryl)]peroxyhexyne-3

The preparation described in Example 6 was repeated with 8.70 g. (0.05 mole) of 2,5-dihydroperoxy-2,5-dimethylhexyne-3, instead of 3,6-dihydroperoxy-3,6-dimethyloctane. A viscous, syrup-like product was obtained and identified as the desired difunctional pseudo perester.

EXAMPLE 8

Preparation of 1,1,4,4-tetraphenyl-1,4-di[2-(2-phenyl-5-oxo-2,5-dihydro-3,4-benzofuryl)]peroxybutyne-2

The preparation described in Example 6 was repeated except that 21.10 g. (0.05 mole) of 1,4-dihydroperoxy-1,1,4,4-tetraphenylbutyne-2 was the peroxy reactant. A viscous, syrup-like product was obtained and identified as the desired difunctional pseudo perester.

EXAMPLE 9

Preparation of bis{cyclohexyl-1-[2-(2-phenyl-5-oxo-2,5-dihydro-3,4-benzofuryl]peroxy)}acetylene The preparation described in Example 6 was repeated except that 12.70 g. (0.05 mole) of bis(cyclohexyl-1-hydroperoxy)-acetylene was used as the difunctional hydroperoxy reactant. A viscous, syrup-like product was obtained and identified as the desired difunctional pseudo perester.

EXAMPLE 10

Preparation of 2,5-dimethyl-2,5-di-{2-[2(2-methylphenyl)-5-oxo-2,5-dihydro-3,4-benzofuryl]}peroxyhexane The pseudo chloride of 2-(2-methylbenzoyl) benzoic acid was prepared by refluxing a mixture of 0.5 mole of this acid, 0.75 mole of thionyl chloride and 250 ml. of benzene, for about twenty hours. The low-boiling materials present in the reaction mixture were completely removed under reduced pressure using a water aspirator and a rotating evaporator. A viscous product was obtained in a quantitative yield, based on the organic and used for the reaction.

A solution of 11.13 g. (0.05 mole) of 2,5-dihydroperoxy-2,5-dimethylhexane having 80% purity and 7.90 g. (0.10 mole) pyridine in 25 ml. of p-dioxane, was added to 25.85 g. (0.10 mole) of finely divided pseudo chloride of 2-(2-methylbenzoyl)benzoic acid, at 15–20° C. with agitation. The reaction mixture was stirred at 25–35° C. for four hours and then allowed to stand at room temperature for about twelve hours. After being mixed with 50 ml. of water, the mixture was extracted five times with 40 ml. portions of ether. The ether extract was washed ten times with 20 ml. portions of a basic aqueous solution containing 1% of sodium hydroxide and 5% of sodium bicarbonate and three times with 20 ml. portions of water, and finally dried over anhydrous magnesium sulfate. Filtration and thorough removal of low-boiling materials under reduced pressure with a water respirator and a rotating evaporator gave a light-brown viscous, syrup-like product in an 80% yield, based on the amount of pseudo chloride of 2-(2-methylbenzoyl) benzoic acid used for the reaction. The product was identified as the difunctional pseudo perester, 2,5-dimethyl-2,5-di{2[2-(2-methylphenyl)-5-oxo - 2,5 - dihydro-3,4-benzofuryl]}peroxyhexane.

EXAMPLE 11

Preparation of 2,5-dimethyl-2,5-di{2-[2-(2-methylphenyl)-5-oxo-2,5-dihydro-3,4-benzofuryl]}peroxyhexyne-3

The preparation described in Example 10 was repeated except that 8.70 g. (0.05 mole) of 2,5-dihydroperoxy-2,5-dimethylhexyne-3 was used as the difunctional hydroperoxy reactant. A viscous, syrup-like product was obtained and identified as the desired difunctional pseudo perester.

EXAMPLE 12

Preparation of 2,5-dimethyl-2,5-di{2-[2-(2-methylphenyl)-5-oxo-2,5-dihydro-3,4-(6 - methylbenzo)furyl}peroxyhexane The pseudo chloride of 2-(2-methylbenzoyl)-6-methylbenzoic acid was prepared by refluxing a mixture of 0.5 mole of the acid, 0.75 mole of thionyl chloride and 250 ml. of benzene, for about twenty hours. The thorough removal of low-boiling materials, present in the mixture, under reduced pressure using a water aspirator and a rotating evaporator gave a viscous product in a quantitative yield, based on the amount of the organic acid used for the reaction.

To 27.25 g. (0.10 mole) of finely divided pseudo chloride of 2-(2-methylbenzoyl)-6-methylbenzoic acid was added a solution of 11.13 g. (0.05 mole) of 2,5-dihydroperoxy-2,5-dimethylhexane having 80% purity and 7.90 g. (0.10 mole) of pyridine in 25 ml. of p-dioxane, at 15–20° C., with stirring. The reaction mixture was stirred at 25–35° C., for four hours, and then allowed to stand at room temperature for about twelve hours. The mixture was mixed with 50 ml. of water, and extracted five times with 40-ml. portions of ether. The ether solution was washed ten times with 20-ml. portions of a basic aqueous solution containing 1% of sodium hydroxide and 5% of sodium bicarbonate, and three times with 20-ml. portions of water. Finally, it was dried over anhydrous magnesium sulfate. Filtration and removal of low-boiling materials under reduced pressure using a water-aspirator and a rotating evaporator left a viscous, syrup-like product, in a yield of 80% based on the amount of pseudo chloride of 2-(2-methylbenzoyl)-6-methylbenzoic acid used for the reaction. The product was identified as the difunctional pseudo perester, 2,5-dimethyl-2,5-di{2-[2-(2-methylphenyl-5-oxo-2,5-dihydro-3,4-(6 - methylbenzo)furyl]}peroxyhexane.

EXAMPLE 13

Preparation of 2,5-dimethyl-2,5-di{2-[2-(2-methylphenyl)-5-oxo-2,5-dihydro - 3,4 - (6-methylbenzo)furyl]}peroxyhexyne-3

The preparation described in Example 12 was repeated except that 8.70 g. (0.04 mole) of 2,5-dihydroperoxy-2,5-dimethylhexyne-3 was used as the peroxy reactant. A viscous, syrup-like product was obtained and identified as the desired difunctional pseudo perester.

It is obvious that other modifications and variations of the present invention are possible in the light of the above teachings. It is therefore, to be understood that changes may be made in the particular embodiments of the invention described, which are within the full intended scope of the invention as defined by the appended claims.

What is claimed is:
1. An organic perester, namely 2,5-dimethyl-2,5-bis[2-(2-phenyl-5-oxo - 2,5 - dihydro-3,4-benzofuryl) peroxy] hexane.
2. An organic perester, namely 3,6-dimethyl-3,6-bis[2-(2-phenyl - 5 - oxo-2,5-dihydro-3,4-benzofuryl) peroxy] octane.
3. An organic perester, namely, 2,5-dimethyl-2,5-bis {2-[2-(2-methylphenyl)-5-oxo - 2,5 - dihydro-3,4-(6-methyl) benzofuryl} peroxy] hexyne-3.
4. An organic perester, namely, 2,5-dimethyl-2,5-bis {2-[2-(2 - methylphenyl)-5-oxo-2,5-dihydro-3,4-benzofuryl} peroxy] hexyne-3.
5. An organic perester, namely, bis {cyclohexyl-1- [2-(2-phenyl-5-oxo - 2,5 - dihydro-3,4-benzofuryl)] peroxy} acetylene.
6. An organic perester, namely 2,5-dimethyl-2,5-bis [2-(2-phenyl-5-oxo - 2,5 - dihydro-3,4-benzofuryl) peroxy] hexyne-3.
7. An organic perester, namely 2,5-dimethyl-2,5-bis {2-(2-[2 - (methylphenyl)-5-oxo-2,5-dihydro-3,4-benzofuryl} peroxy] hexane.
8. An organic perester, namely 2,5-dimethyl-2,5-bis {2-[2-(2-methylphenyl)-5-oxo - 2,5 - dihydro-3,4-(6-methyl) benzofuryl} peroxy]hexane.
9. An organic perester, namely 1,1,4,4-tetraphenyl-1,4-bis [2-(2 - phenyl-5-oxo-2,5-dihydro - 3,4 - benzofuryl) peroxy] butyne-2.

References Cited
UNITED STATES PATENTS 3,532,717   10/1970   Strojny _____ 260—343.3

ALEX MAZEL, Primary Examiner
A. M. T. TIGHE, Assistant Examiner

U.S. Cl. X.R.
260—942